US011244660B2

(12) United States Patent
Rai Kurlethimar et al.

(10) Patent No.: US 11,244,660 B2
(45) Date of Patent: Feb. 8, 2022

(54) RECOVERY FROM EYE-TRACKING LOSS IN FOVEATED DISPLAYS

(71) Applicant: Apple Inc., Cupertino, CA (US)

(72) Inventors: Yashas Rai Kurlethimar, San Jose, CA (US); Can Jin, San Jose, CA (US); Nicolas Pierre Marie Frederic Bonnier, Campbell, CA (US); Jiaying Wu, San Jose, CA (US); Andrew B. Watson, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/174,138

(22) Filed: Feb. 11, 2021

(65) Prior Publication Data

US 2021/0287633 A1    Sep. 16, 2021

Related U.S. Application Data

(60) Provisional application No. 62/989,394, filed on Mar. 13, 2020.

(51) Int. Cl.
*G09G 5/38* (2006.01)
*G06F 3/01* (2006.01)
(Continued)

(52) U.S. Cl.
CPC .......... *G09G 5/38* (2013.01); *G02B 27/0093* (2013.01); *G06F 3/013* (2013.01); *G06K 9/4671* (2013.01); *G09G 2354/00* (2013.01)

(58) Field of Classification Search
None
See application file for complete search history.

(56) References Cited

U.S. PATENT DOCUMENTS 9,727,991 B2    8/2017  Guenter et al.
10,720,128 B2   7/2020  Young et al.
(Continued)

FOREIGN PATENT DOCUMENTS

WO    2019055839 A2    3/2019
WO    2019122493 A1    6/2019
WO    2019162645 A1    8/2019

OTHER PUBLICATIONS

Lei Shi et al.: "What Are You Looking at? Detecting Human Intention in Gaze based Human-Robot Interaction"; ARXIV.Org, Cornell University Library, 201 Olin Library Cornell University, Sep. 17, 2019 (XP081478167).
(Continued)

*Primary Examiner* — Jwalant Amin
(74) *Attorney, Agent, or Firm* — Fletcher Yoder P.C.

(57) ABSTRACT

An electronic device that includes a display and an eye tracker configured to collect eye tracking data regarding a gaze of one or more of a user's eyes across the display is disclosed herein. The electronic device includes processing circuitry that is operatively coupled to the display and configured to foveate one or more areas of the display according to the eye tracking data. If the eye tracking data input is lost, the processing circuitry is configured to recover from the loss of eye tracking data by changing one or more aspects of the foveated areas (e.g., size, resolution, etc.) until a threshold is satisfied. As time elapses since loss of eye tracking, the foveated areas move toward a center or a salient region of the display.

20 Claims, 14 Drawing Sheets

(51) Int. Cl.
    *G06K 9/46*         (2006.01)
    *G02B 27/00*     (2006.01)

(56)             References Cited

U.S. PATENT DOCUMENTS

| | | |
|---|---|---|
| 10,748,477 B2 | 8/2020 | Park et al. |
| 2015/0177833 A1* | 6/2015 | Vennstrom .......... G06F 3/04842 345/156 |
| 2017/0287112 A1* | 10/2017 | Stafford .................. G06F 3/013 |
| 2017/0287446 A1* | 10/2017 | Young .................... G06F 3/013 |
| 2019/0107884 A1* | 4/2019 | Williams .............. G06F 3/0481 |
| 2019/0339770 A1* | 11/2019 | Kurlethimar ........... G06F 3/013 |
| 2020/0043236 A1* | 2/2020 | Miller ................ G02B 27/0172 |
| 2020/0192475 A1 | 6/2020 | Gustafsson et al. |
| 2020/0319457 A1* | 10/2020 | Jenabzadeh .......... A61B 5/4094 |
| 2020/0394830 A1 | 12/2020 | Choubey et al. |
| 2021/0174768 A1* | 6/2021 | Jarvenpaa ............... G06F 3/012 |
| 2021/0248361 A1* | 8/2021 | Matsuo ............. G06K 9/00362 |

OTHER PUBLICATIONS

International Search Report & Written Opinion for PCT Application No. PCT/US2021/022163, dated Jun. 23, 2021; 13 pgs.

* cited by examiner

RECOVERY FROM EYE-TRACKING LOSS IN FOVEATED DISPLAYS

CROSS-REFERENCE TO RELATED APPLICATIONS

This application claims priority to and the benefit of U.S. Provisional Application No. 62/989,394, filed Mar. 13, 2020, and entitled, "RECOVERY FROM EYE-TRACKING LOSS IN FOVEATED DISPLAYS," which is incorporated herein by reference in its entirety for all purposes.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to recovery techniques that can be used with foveated content, such as dynamically foveated content. Foveation refers to a technique in which some aspect of an image (e.g., an amount of detail, resolution, image quality, or brightness) is varied across displayed content based on a fixation point, such as a point or area within the content itself, a point or region of the content on which one or more eyes of a user are focused, or movement of the one or more eyes of the user. That is, for example, the amount of detail in various portions of the image can be varied using different resolutions. Foveation can reduce an amount of power used to display the content on the electronic display, a number of computations used to generate the content, and an amount of bandwidth used to stream the content displayed by reducing, for example, the resolution of at least a portion of the image.

In static foveation, various areas of an electronic display having different resolutions each have a fixed size and location on the electronic display for each frame of content displayed to the user. In dynamic foveation, the various areas at different resolutions may change between two or more images based on the gaze of the viewer. For example, as the eyes of the user move across the electronic display from a top left corner to a bottom right corner, the high resolution portion of the electronic display also moves from the top left corner of the display to the bottom right corner of the display. For content that uses multiple images, such as videos and video games, the content may be presented to the viewer by displaying the images in rapid succession. The high resolution and lower resolution portions of the electronic display in which the content is displayed may change between frames.

For dynamic foveation, an eye tracking system is used to determine a focal point of the eyes of the user on the electronic display. That is, a continuous input from the eye tracking system is provided to a foveation system and used to determine the size and location of the high resolution area on the electronic display. If the eye tracking system is not able to determine a focal point of the eyes of the user or if a connection to the eye tracking system is interrupted, the areas of varying resolution may no longer correspond to the focal point of the eyes of the user. Without the input, the foveation system may no longer function and may cause issues with a quality of an experience of a user or viewing comfort because the high resolution area of the display maintains the same location regardless of the focal point of the eyes of the user. Thus, a failure of the eye tracking system may cause a reduction in image quality on the display as perceived by the user.

Techniques are presented herein to reduce an occurrence of the reduction in image quality of the image on the display. Specifically, embodiments presented herein provide techniques for foveation of a display when eye tracking is not available or when an error in eye tracking occurs.

BRIEF DESCRIPTION OF THE DRAWINGS

Various aspects of this disclosure may be better understood upon reading the following detailed description and upon reference to the drawings described below.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
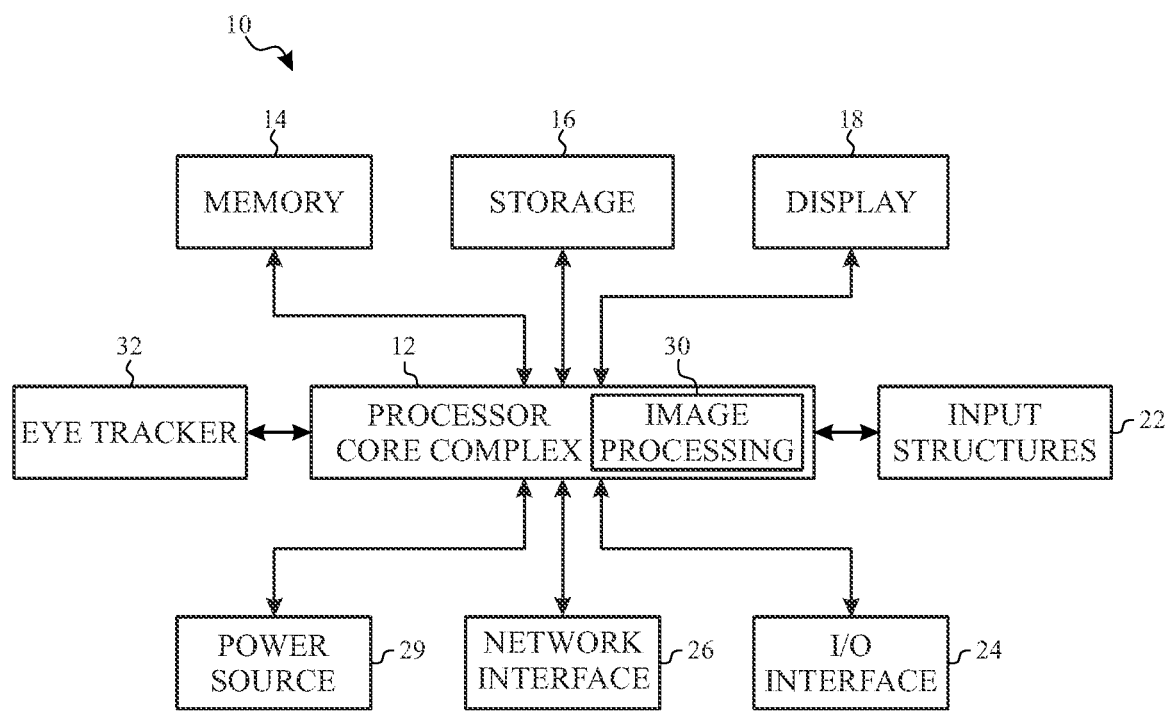
FIG. 1 is a block diagram of an electronic device with an electronic display, according to an embodiment.
Figure 2:
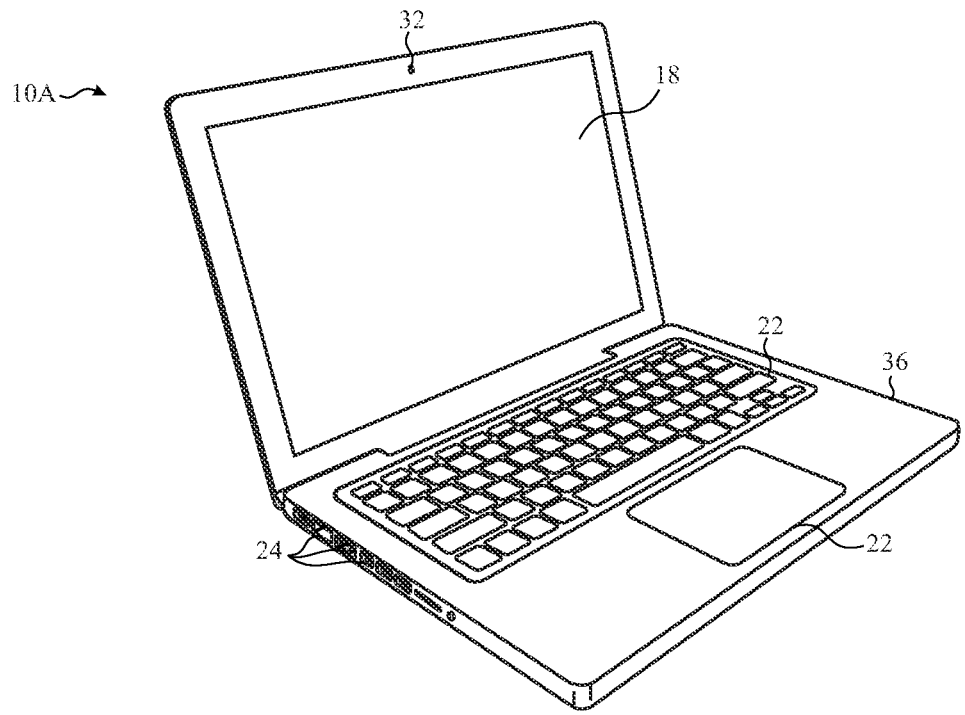
FIG. 2 is a perspective view of a notebook computer representing an embodiment of the electronic device of FIG. 1.
Figure 4:
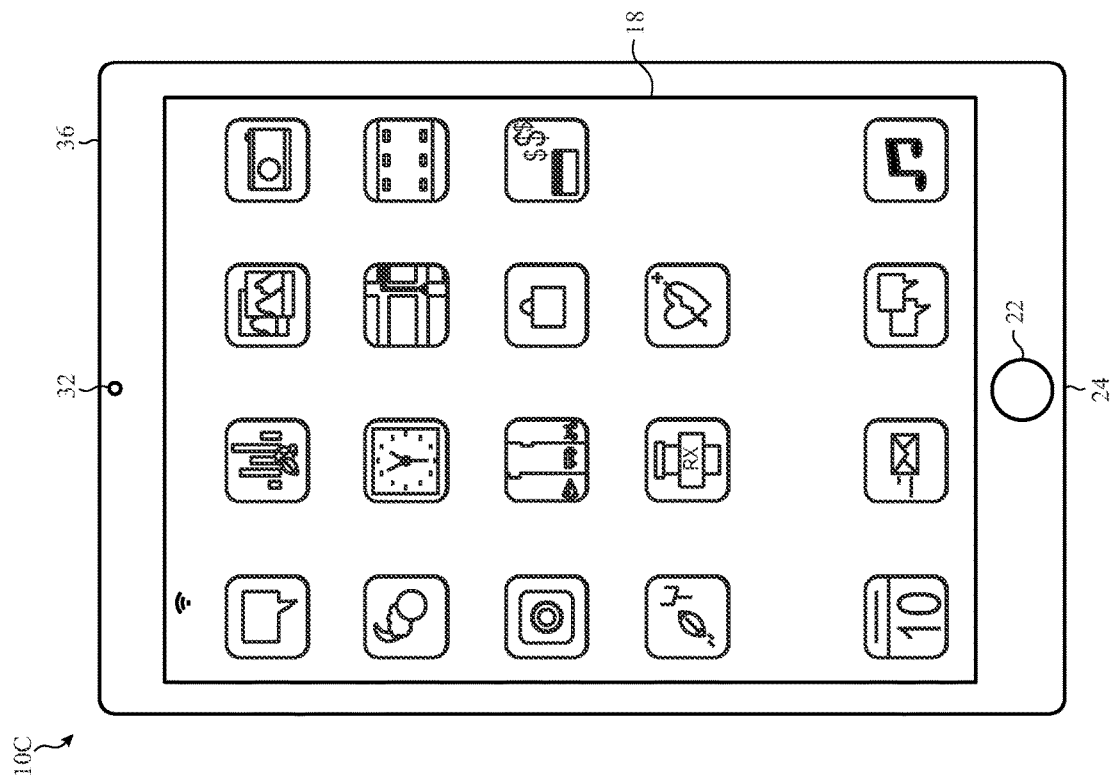
FIG. 4 is a front view of another hand-held device representing another embodiment of the electronic device of FIG. 1.
Figure 3:
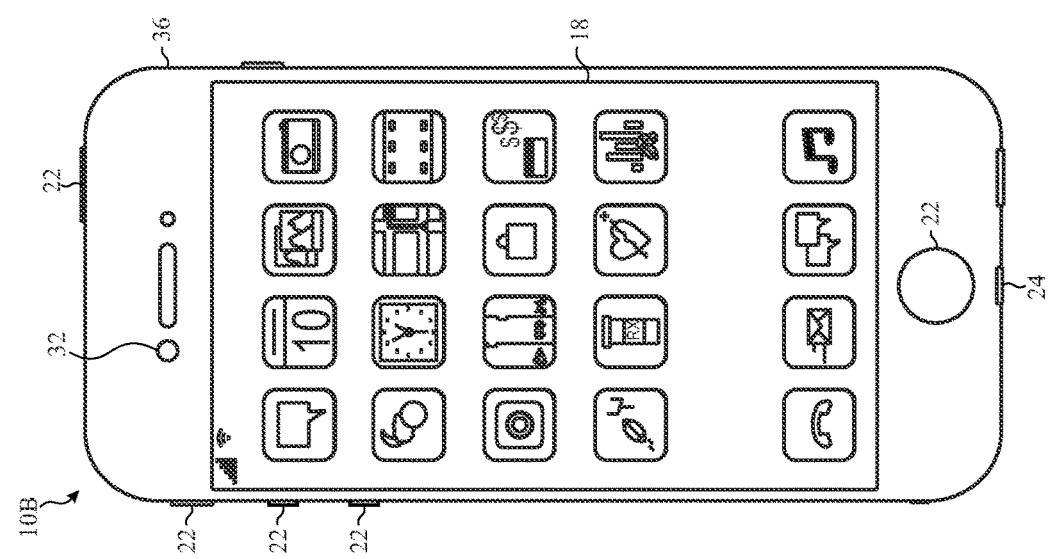
FIG. 3 is a front view of a hand-held device representing another embodiment of the electronic device of FIG. 1.
Figure 5:
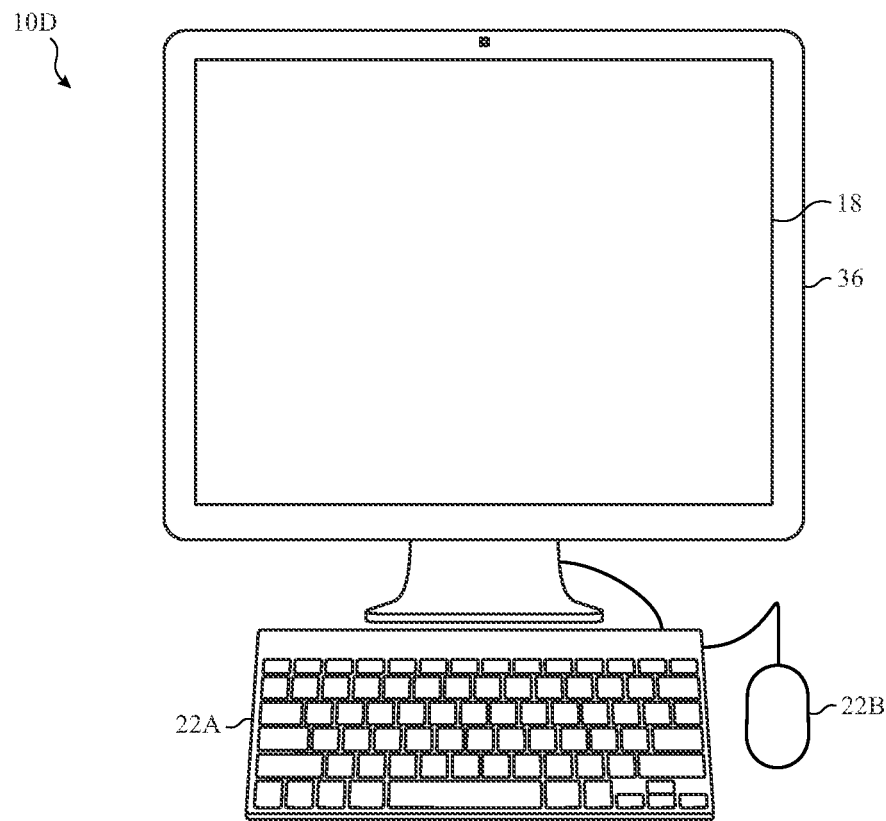
FIG. 5 is a front view of a desktop computer representing another embodiment of the electronic device of FIG. 1.
Figure 6:
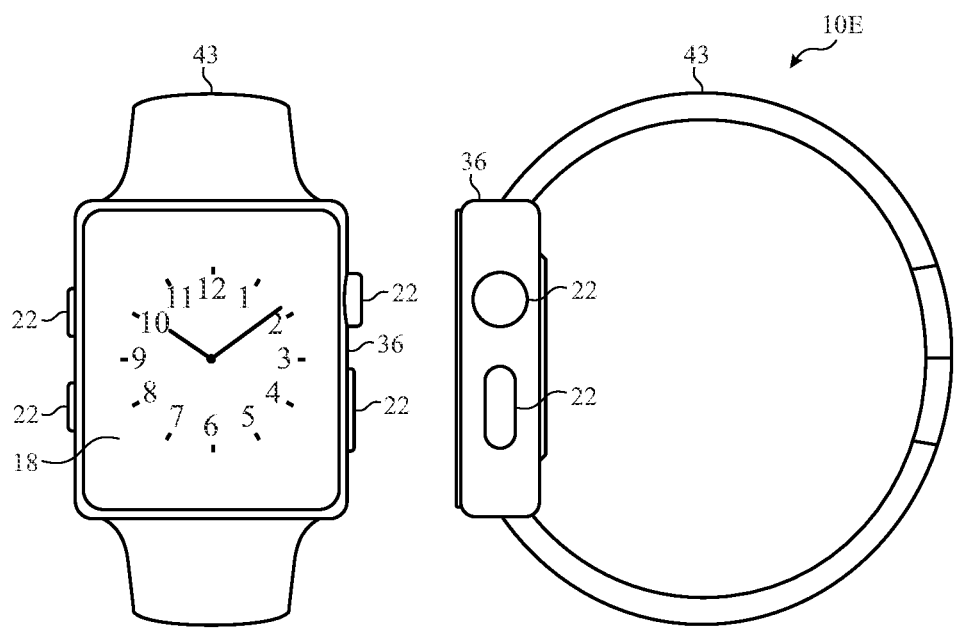
FIG. 6 is a perspective view of a wearable electronic device representing another embodiment of the electronic device of FIG. 1.

FIG. 1 illustrates a block diagram of an electronic device 10 that may provide recovery techniques when eye tracking is lost for a foveated display. As described in more detail below, the electronic device 10 may represent any suitable electronic device, such as a computer, a mobile phone, a portable media device, a tablet, a television, a virtual-reality headset, a vehicle dashboard, or the like. The electronic device 10 may represent, for example, a notebook computer 10A as depicted in FIG. 2, a handheld device 10B as depicted in FIG. 3, a handheld device 10C as depicted in FIG. 4, a desktop computer 10D as depicted in FIG. 5, a wearable electronic device 10E as depicted in FIG. 6, or any suitable similar device with a display.

The electronic device 10 shown in FIG. 1 may include, for example, a processor core complex 12, a memory 14, a storage device 16, an electronic display 18, input structures 22, an input/output (I/O) interface 24, a network interface 26, a power source 29, and an eye tracker 32. The electronic device 10 may include image processing circuitry 30. The image processing circuitry 30 may prepare image data (e.g., pixel data) from the processor core complex 12 for display on the electronic display 18.

Although the image processing circuitry 30 is shown as a component within the processor core complex 12, the image processing circuitry 30 may represent any suitable hardware and/or software that may occur between the initial creation of the image data and its preparation for display on the electronic display 18. Thus, the image processing circuitry 30 may be located wholly or partly in the processor core complex 12, wholly or partly as a separate component between the processor core complex 12 and the electronic display 18, or wholly or partly as a component of the electronic display 18.

The various components of the electronic device 10 may include hardware elements (including circuitry), software elements (including machine-executable instructions stored on a tangible, non-transitory medium, such as the local memory 14 or the storage device 16, or a combination of both hardware and software elements. It should be noted that FIG. 1 is merely one example of a particular implementation and is intended to illustrate the types of components that may be present in the electronic device 10. Indeed, the various components illustrated in FIG. 1 may be combined into fewer components or separated into additional components. For instance, the local memory 14 and the storage device 16 may be included in a single component.

The processor core complex 12 may perform a variety of operations of the electronic device 10, such as generating image data to be displayed on the electronic display 18 and performing dynamic foveation of the content to be displayed on the electronic display 18. The processor core complex 12 may include any suitable data processing circuitry to perform these operations, such as one or more microprocessors, one or more application specific processors (ASICs), or one or more programmable logic devices (PLDs). In some cases, the processor core complex 12 may execute programs or instructions (e.g., an operating system or application) stored on a suitable storage apparatus, such as the local memory 14 and/or the storage device 16.

The memory 14 and the storage device 16 may also store data to be processed by the processor core complex 12. That is, the memory 14 and/or the storage device 16 may include random access memory (RAM), read only memory (ROM), rewritable non-volatile memory such as flash memory, hard drives, optical discs, or the like.

The electronic display 18 may be a self-emissive display, such as an organic light emitting diode (OLED) display, an LED display, or μLED display, or may be a liquid crystal display (LCD) illuminated by a backlight. In some embodiments, the electronic display 18 may include a touch screen, which may allow users to interact with a user interface of the electronic device 10. Additionally, the electronic display 18 may show foveated content.

The electronic display 18 may display various types of content. For example, the content may include a graphical user interface (GUI) for an operating system or an application interface, still images, video, or any combination thereof. The processor core complex 12 may supply or modify at least some of the content to be displayed.

The input structures 22 of the electronic device 10 may enable a user to interact with the electronic device 10 (e.g., pressing a button or icon to increase or decrease a volume level). The I/O interface 24 and the network interface 26 may enable the electronic device 10 to interface with various other electronic devices. The power source 29 may include any suitable source of power, such as a rechargeable lithium polymer (Li-poly) battery and/or an alternating current (AC) power converter.

The network interface 26 may include, for example, interfaces for a personal area network (PAN), such as a Bluetooth network, a local area network (LAN) or wireless local area network (WLAN), such as an 802.11x Wi-Fi network, and/or a wide area network (WAN), such as a cellular network. The network interface 26 may also include interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-wideband (UWB), alternating current (AC) power lines, and so forth.

The eye tracker 32 may measure positions and movement of one or both eyes of a person viewing the electronic display 18 of the electronic device 10. For instance, the eye tracker 32 may be a camera that records the movement of a viewer's eye(s) as the viewer looks at the electronic display 18. However, several different practices may be employed to track a viewer's eye movements. For example, different types of infrared/near infrared eye tracking techniques such as bright-pupil tracking and dark-pupil tracking may be utilized. In these types of eye tracking, infrared or near infrared light is reflected off of one or both of the eyes of the viewer to create corneal reflections.

A vector between the center of the pupil of the eye and the corneal reflections may be used to determine a point on the electronic display 18 at which the viewer is looking. Moreover, as discussed below, varying portions of the electronic display 18 may be used to show content in high and low resolution portions based on the point of the electronic display 18 at which the viewer is looking.

As will be described in more detail herein, the image processing circuitry 30 may perform particular image processing adjustments to counteract artifacts that may be observed when the eye tracker 32 loses track of eye movement during foveation. For example, foveated areas rendered on the electronic display 18 may be dynamically adjusted (e.g., by size and/or position).

As discussed above, the electronic device 10 may be a computer, a portable electronic device, a wearable electronic device, or other type of electronic device. Example computers may include generally portable computers (such as laptop, notebook, and tablet computers) as well as computers that are generally used in one place (such as conventional desktop computers, workstations, and/or servers). In certain embodiments, the electronic device 10 in the form of a computer may be a model of a MacBook®, MacBook® Pro, MacBook Air®, iMac®, Mac® mini, or Mac Pro® available from Apple Inc. of Cupertino, Calif.

By way of example, the electronic device 10 depicted in FIG. 2 is a notebook computer 10A, in accordance with one embodiment of the present disclosure. The computer 10A includes a housing or enclosure 36, an electronic display 18, input structures 22, and ports of an I/O interface, such as the I/O interface 24 discussed with respect to FIG. 1. In one embodiment, a user of the computer 10A may utilize the input structures 22 (such as a keyboard and/or touchpad) to interact with the computer 10A, such as to start, control, or operate a GUI or applications running on the computer 10A. For example, a keyboard and/or touchpad may allow the user to navigate a user interface or application interface displayed on the electronic display 18. Additionally, the computer 10A may include an eye tracker 32, such as a camera.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. The handheld device 10B includes an enclosure 36 to protect interior components from physical damage and to shield the interior components from electromagnetic interference. The enclosure 36 may surround the electronic display 18. The I/O interfaces 24 may be formed through the enclosure 36 and may include, for example, an I/O port for a hardwired connection for charging and/or content manipulation using a standard connector and protocol, such as the Lightning connector provided by Apple Inc., a universal serial bus (USB), or other similar connector and protocol. Moreover, the handheld device 10B may include an eye tracker 32.

The user input structures 22, in combination with the electronic display 18, may allow a user to control the handheld device 10B. For example, the input structures 22 may activate or deactivate the handheld device 10B, navigate a user interface to a home screen or a user-configurable application screen, and/or activate a voice-recognition feature of the handheld device 10B. Other input structures 22 may provide volume control, or toggle between vibrate and ring modes. The input structures 22 may also include a microphone to obtain a voice of the user for various voice-related features, and a speaker to enable audio playback and/or certain capabilities of the handheld device 10B. The input structures 22 may also include a headphone input to provide a connection to external speakers and/or headphones.

FIG. 4 depicts a front view of another handheld device 10C, which represents another embodiment of the electronic device 10 discussed with respect to FIG. 1. The handheld device 10C may represent, for example, a tablet computer or portable computing device. By way of example, the handheld device 10C may be a tablet-sized embodiment of the electronic device 10, which may be, for example, a model of an iPad® available from Apple Inc. The various components of the handheld device 10C may be similar to the components of the handheld device 10B discussed with respect to the FIG. 3. The handheld device 10C may include an eye tracker 32.

FIG. 5 depicts a computer 10D which represents another embodiment of the electronic device 10 discussed with respect to FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. The enclosure 36 of the computer 10D may be provided to protect and enclose internal components of the computer 10D, such as the electronic display 18. In certain embodiments, a user of the computer 10D may interact with the computer 10D using various peripheral input devices, such as input structures 22A and 22B (e.g., keyboard and mouse), which may connect to the computer 10D. Furthermore, the computer 10D may include an eye tracker 32.

FIG. 6 depicts a wearable electronic device 10E representing another embodiment of the electronic device 10 discussed with respect to FIG. 1. The wearable electronic device 10E is configured to operate using techniques described herein. By way of example, the wearable electronic device 10E may be virtual reality glasses. However, in other embodiments, the wearable electronic device 10E may include other wearable electronic devices such as augmented reality glasses.

The electronic display 18 of the wearable electronic device 10E may be visible to a user when the electronic device 10E is worn by the user. Additionally, while the user is wearing the wearable electronic device 10E, an eye tracker (not shown) of the wearable electronic device 10E may track the movement of one or both of the eyes of the user. In some instances, the handheld device 10B discussed with respect to FIG. 3 may be used in the wearable electronic device 10E. For example, a portion 37 of a headset 38 of the wearable electronic device 10E may allow a user to secure the handheld device 10B therein and use the handheld device 10B to view virtual reality content.

The electronic display 18 of the electronic device 10 may show images or frames of content such as photographs, videos, and video games in a foveated manner. Foveation refers to a technique in which an amount of detail, resolution, image quality, or brightness is varied across an image based on a fixation point, such as a point or area within the image itself, a point or region of the image on which a viewer's eyes are focused, or based on the gaze movement of the viewer's eyes. More specifically, the amount of detail can be varied by using different resolutions in various portions of an image. For instance, in a first portion of the electronic display 18, one pixel resolution may be used to display one portion of an image, while a lower or higher resolution may be used for a second portion of the electronic display 18. The second portion of the electronic display 18 may be in a different area of the display 18 than the first area or may be located within the first area.

In some embodiments, the reduction in image quality or resolution may be a gradual (i.e., smooth) reduction from a central portion having a high resolution to a peripheral edge of the foveated area. That is, for example, the resolution of the foveated region may have a central portion with a high resolution. A resolution of an outer portion of the foveated region may gradual decrease from an edge of the central region to an edge of the outer portion. This technique is discussed with respect to FIGS. 14A-14C and 15A-15D below.

Figure 7A:
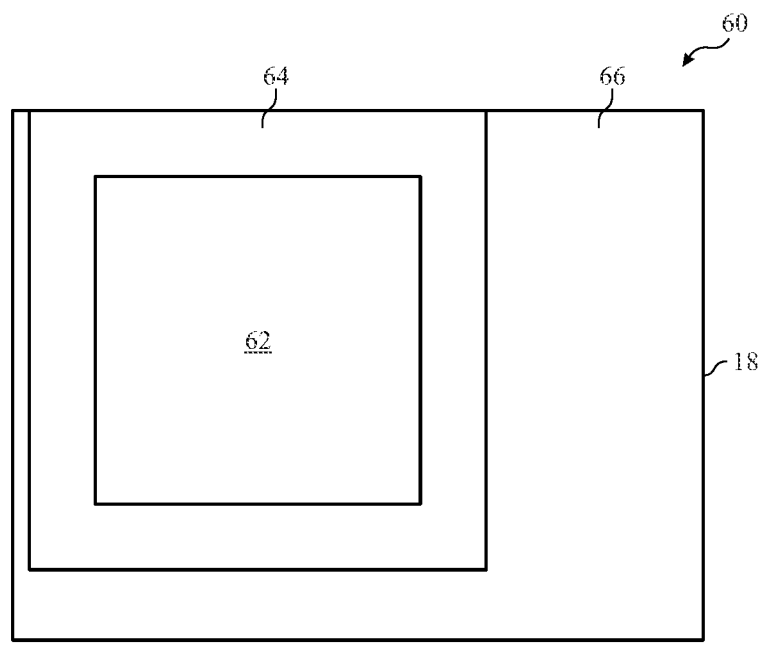
FIG. 7A is a diagram of the display of FIG. 1 in which static foveation is utilized, according to an embodiment.

FIG. 7A is a diagram 60 representative of the electronic display 18 utilizing static foveation. In static foveation, a size and a location of the various resolution areas of the electronic display 18 are fixed. As shown, the electronic display 18 includes a high resolution area 62, a medium resolution area 64, and a low resolution area 66. The actual resolutions of the areas 62, 64, and 66 are relative to the resolutions of the other areas. For example, the high resolution area 62 has a higher resolution than a resolution of the medium resolution area 64 and a resolution of the low resolution area 66. Similarly, the resolution of the medium resolution area 64 may be lower than the resolution of the high resolution area 62 but higher than the low resolution area 66. Finally, the resolution of the low resolution area 66 may be lower than the resolutions of the high resolution area 62 and the medium resolution area 64.

As one example, a resolution of the low resolution area 66 may be about 10 pixels per degree (ppd), a resolution of the medium resolution area 64 may be about 20 ppd, and a resolution of the high resolution area 62 may be about 40 ppd. While three foveated areas are illustrated in FIG. 7A, it should be understood that there may be two or more foveated areas (e.g., a high resolution area and a low resolution area) of the electronic display 18.

As described above, electronic displays such as the electronic display 18 may also use dynamic foveation. In dynamic foveation, the areas of the electronic display 18 at which the various resolutions are used may change between two or more images based on the focal point of the eyes of the user. As an example, content that uses multiple images, such as videos and video games, may be presented to viewers by displaying the images in rapid succession. The portions of the electronic display 18 in which the content is displayed with a relatively high resolution and a relatively low resolution may change, for instance, based on data collected by the eye tracker 32 which indicates a focal point on the electronic display 18 of the eyes of the user.

Figure 7B:
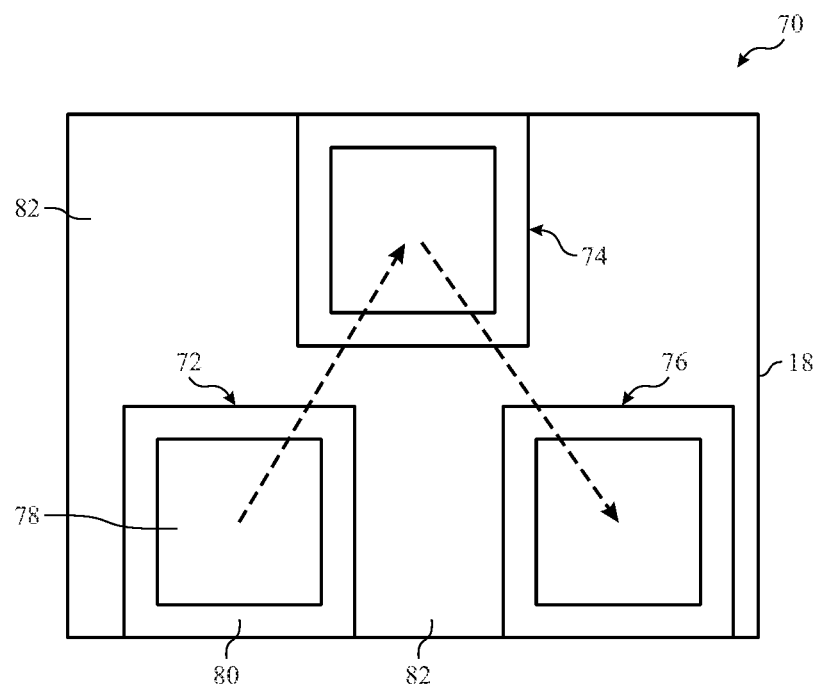
FIG. 7B is a diagram of the display of FIG. 1 in which dynamic foveation is utilized, according to an embodiment.

FIG. 7B is a diagram 70 that illustrates the electronic display utilizing dynamic foveation. The diagram 70 includes a first frame 72, a second frame 74, and a third frame 76, each having a high resolution area 78, a medium resolution area 80, and a low resolution area 82. The first frame 72, the second frame 74, and the third frame 76 each may represent a different portion of a single content frame (i.e., a different portion of a single image) or each may represent a different content frame of consecutive content frames (i.e., content frames of a video). In some instances, transitional frames between these frames provide a smooth movement of the frames 72, 74, and/or 76 corresponding to tracked movement of the eyes of the user. The high resolution area 78, the medium resolution area 80, and the low resolution area 82 each may correspond to the high resolution area 62, the medium resolution area 64, and the low resolution area 66 discussed with respect to FIGS. 7A and 7B.

The frames 72, 74, 76 are in different locations on the electronic display 18 based on a focal point of the eyes of the user. During a transition from the first frame 72 to the second frame 74 (or when the focal point of the eyes of the user move from a location of the first frame 72 to a location of the second frame 74), the high resolution area 78 and medium resolution area 80 are moved from near a bottom left corner of the electronic display 18 to a top central location of the electronic display 18. Similarly, the high resolution area 78 and medium resolution area 80 shift towards a bottom right corner of the electronic display 18 with gaze of the user for display of the third frame 76.

The present disclose provides techniques for recovering a foveated display when an eye tracking system cannot track the focal point of the eyes of the user. For example, the eye tracking system may lose the ability to track a focal point of the eyes of the user for various reasons, some of which are discussed below. FIGS. 8A-8D illustrate various durations of loss in eye tracking.

Figure 8A:
FIG. 8A illustrates a very short term loss of eye tracking, according to an embodiment.

FIG. 8A illustrates a short term loss of eye tracking, according to embodiments of the disclosure. In this case, the eye tracking system may lose the ability to track a focal point of an eye of the user for a period of less than about 60 ms. This type of loss may occur due to an error in the tracking system or processing prioritization (e.g., thread throttling) in the electronic device 10 discussed above. This type of loss of eye tracking may be imperceptible to a human. Thus, a system utilizing foveation may use a specific technique to remedy this type of loss of eye tracking.

Figure 8B:
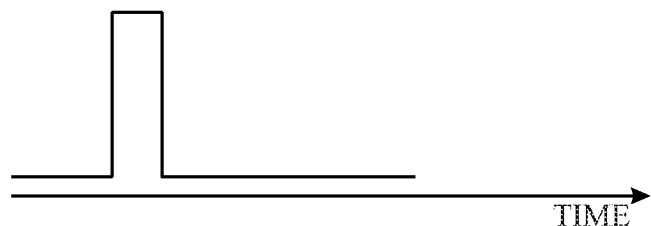
FIG. 8B illustrates a relatively short term loss of eye tracking, according to an embodiment.

FIG. 8B illustrates a relatively short term loss of eye tracking, according to embodiments of the disclosure. A period for this type of loss may be between about 60 ms and up to about 1 second. This type of loss may occur, for example, when the user blinks or when the eye tracking system is suddenly moved in relation to the user's eyes.

Figure 8C:
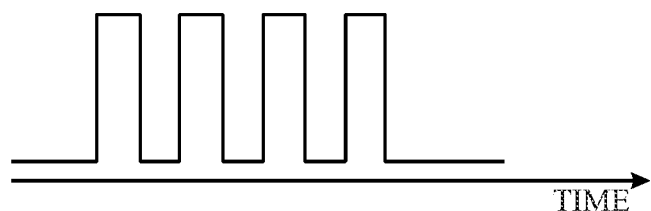
FIG. 8C illustrates a repeating short term loss of eye tracking, according to an embodiment.

FIG. 8C illustrates a repeating short term loss of eye tracking, according to embodiments of the disclosure. A duration of the repetitive loss of eye tracking may be similar to the relatively short term loss discussed above. However, a frequency of the repetitive loss may be periodic or random. This type of loss may occur, for example, due to interference by the user's eyelashes or contact lenses worn by the user that move on the user's eye and interfere with a focus of the eye tracking system. The repetitive loss of eye tracking may be patterned or random.

Figure 8D:
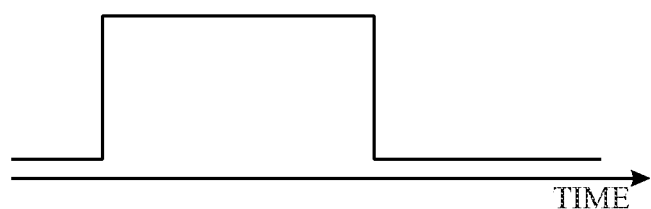
FIG. 8D illustrates a relatively long-term loss of eye tracking, according to an embodiment.

FIG. 8D illustrates a relatively long-term loss of eye tracking, according to embodiments of the disclosure. This type of loss may last for about 1000 ms or longer (i.e., about 1 second or longer) and may be caused, for example, by physiology of the eyes of the user or glasses worn by the user among other things.

Embodiments described herein address the different types and lengths of a loss of eye tracking discussed above. For example, techniques to correct a loss of eye tracking for a very short period (e.g., less than about 60 ms) may be different than techniques to correct loss of eye tracking for a long period (e.g., more than 1 second). Advantageously, techniques to correct loss of eye tracking for a long period while using dynamic foveation may provide a correction without being perceived by the user. That is, the correction may be performed without being visible to the user looking at the electronic device.

Most foveated display systems exhibit undefined behavior when eye tracking capability is lost. For example, when loss of eye tracking occurs a foveated display system may foveate the display at a last known position of the focal point of the eyes of the user, foveate the display at the center of the display (regardless of last known position of the focal point), or render the entire image using an intermediate (i.e., lower) image quality without foveation.

If eye tracking is lost, these behaviors may cause display artifacts to be visible or perceived by the user which negatively affect the experience of the user. The artifacts may include low resolution at the focal point of the eyes of the user, intermittent switching between high resolution and low resolution due to sudden movement of the foveated areas of the display, and flashing resulting from sudden resolution changes at various areas of the display. Thus, loss of eye tracking (and inappropriate mitigation techniques) may cause foveation errors (e.g., a visible low resolution or temporal flashing) on the electronic display to be visible to the user and may deteriorate the experience of the user looking at the electronic display.

To prevent foveation errors and temporal flashing from being visible, techniques described herein alter a resolution, an amount of detail, a brightness, an image quality, a size, and/or a location of the foveated areas (e.g., the high resolution area 62, the medium resolution area 64, and the low resolution area 66 discussed with respect to FIGS. 7A and 7B) so that a focal point of the user's eyes stay within the foveated areas regardless of where the actual focal point of the eyes of the user is located on the electronic display 18. The techniques described herein also provide a smooth transition between dynamic foveation (during normal functioning of the eye tracking system) to static foveation (during long-term loss of eye tracking), such that an occurrence of temporal flashing or sudden changes in image quality are not apparent to the user. In this way, the techniques described herein improve the experience of the user of the electronic device when loss of eye tracking occurs.

In some embodiments, loss of eye tracking may result in changes to a size of one or more foveal areas (e.g., expansion or reduction). A size of the foveal area may expand to make up for a loss in statistical confidence of the actual position of the focal point of the eyes of the user. Thus, a size expansion profile for the foveal area may be determined based on statistical data related to a probability of the location of the focal point on the electronic display. The statistical data may be used to generate foveal area size curves such as those depicted in FIG. 9.

Figure 9:
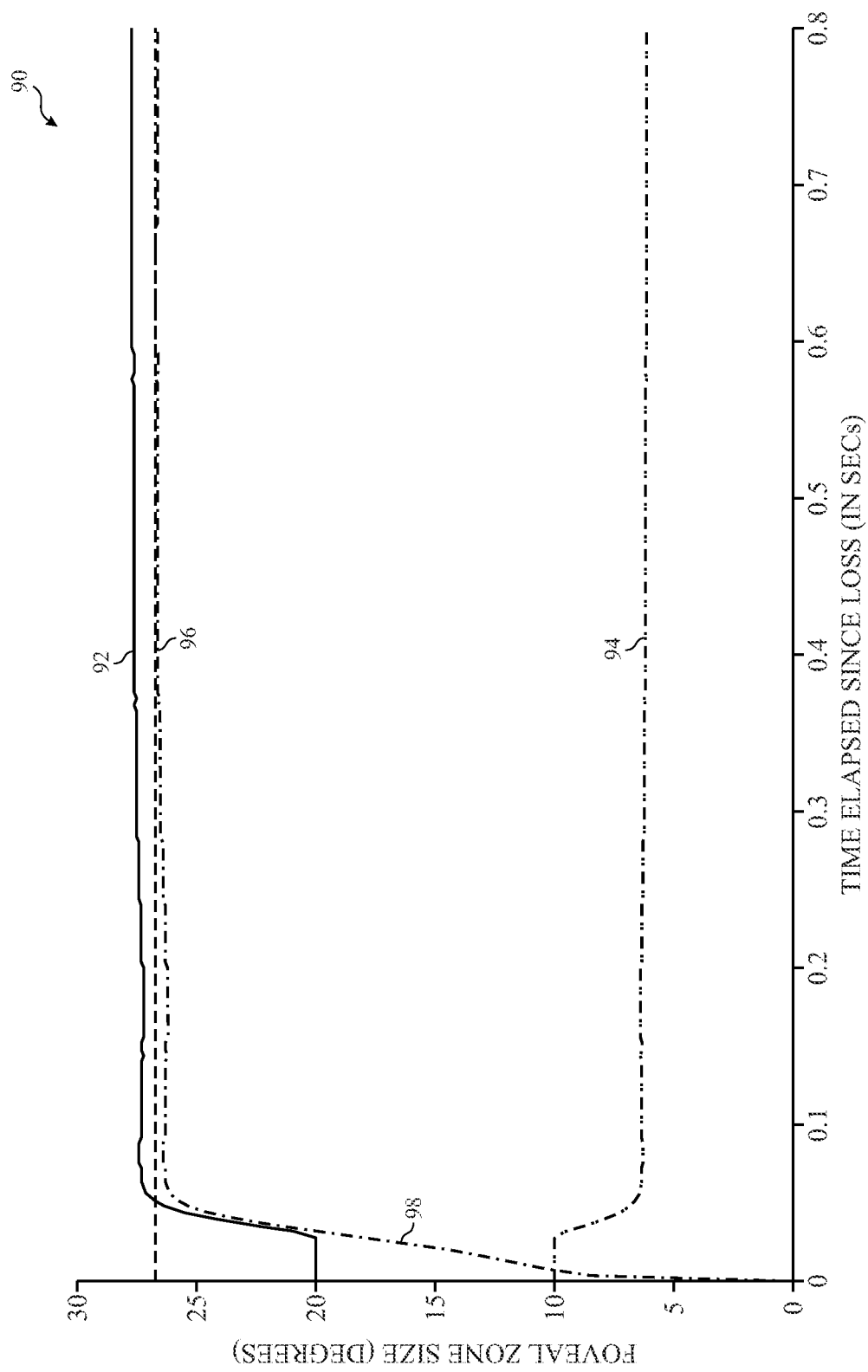
FIG. 9 illustrates a graph for a size of a foveated portion of a display, according to an embodiment.

FIG. 9 illustrates a graph 90 depicting a size of foveated portions of a display, such as the electronic display 18 discussed above, according to one aspect of the disclosure. The graph 90 has a horizontal axis depicting a time elapsed since a loss of eye tracking and a vertical axis relating to a size of foveal areas of an electronic display, such as the high resolution area 62 and the medium resolution area 64 discussed with respect to FIGS. 7A and 7B.

In one embodiment, a first line 94 indicates a loss of confidence in the position of the focal point of the eyes of the user when loss of eye tracking occurs. This loss of confidence is independent of the device size/shape and a task being performed by the user when loss of eye tracking occurs. Thus, a size of the high resolution area 62 and the medium resolution area 64 are increased according to a second line 92. This technique is discussed in more detail with respect to FIGS. 10A-11 below.

In that case, the probability that the focal point of the eyes of the user is within the high resolution area are high. However, this recovery technique uses an increased amount of bandwidth and computing resources to render an image on the display as the size of the foveal areas continue to increase. Thus, if there is a constraint on bandwidth or resources available for rendering an image on the display, this approach may not be feasible or possible.

To reduce the amount of resources for rendering the image on the foveated display, a size of the high resolution area 62 may decrease according to the first line 94 while a size of the medium resolution area 64 increases according to the second line 92. Reducing usage of one or more resources (e.g., bandwidth, processing resources, power, and the like) may maintain total resource usage for the electronic device. Thus, image processing circuitry, such as the image processing circuitry 30 of the electronic device 10 discussed above, may offset at least a portion of an increased resource usage of the increased medium resolution area 64 with the decreased resource usage of the reduced high resolution area 62.

In another embodiment, to reduce resource usage, a resolution of the high resolution area 62 may be decreased as the size of the high resolution area 62 is increased according to the first line 94. This embodiment is discussed with respect to FIGS. 14A-14C and 15A-15D below. Reducing the resolution of the high resolution area 62 may offset at least a portion of the increased resource usage of the increased size of the high resolution area 62.

Once eye tracking is restored, the foveated display system may determine the focal point of the user's eyes and resume operation of the electronic display as before the loss of eye tracking occurred. That is, the foveated areas may be returned to the respective sizes used prior to loss of eye tracking. If eye tracking is not restored, the foveated display system may maintain the new sizes of the foveated areas.

A third line 96 depicts a distance of the high resolution area 62 and the medium resolution area 64 from a center of the electronic display 18. During a loss of eye tracking, as shown by the third line 96, the foveated areas remain at the last known position of the focal point of the eyes of the user (i.e., a substantially constant distance from a center of the electronic display 18) while the size of the foveated areas is changed. It should be noted that the location of the foveated areas may change at various times during the recovery from loss of eye tracking. For example, in some embodiments, upon loss of eye tracking, the foveated areas may immediately move toward or away from the center of the electronic display 18. In other embodiments, the foveated areas may move toward or away from the center of the electronic display 18 after a predetermined time has elapsed since loss of eye tracking. In still other embodiments, the foveated areas may move toward or away from the center of the electronic display 18 at various times after loss of eye tracking based on various factors such as movement of the user's eye prior to loss of eye tracking, the type of content displayed, a length of time since loss of eye tracking, and the like.

FIGS. 10A-10D illustrate foveation of the electronic display 18, loss of eye tracking, and recovery from the loss of eye tracking utilizing static foveation, according to an embodiment. One or more components of the electronic device 10, described with respect to FIG. 1, may control at least some aspects of the foveation of the electronic display 18 described herein. That is, for example, the processor core complex 12 may control a size, a shape, a location, a resolution, and/or movement of the foveated areas of the electronic display.

Figure 10A:
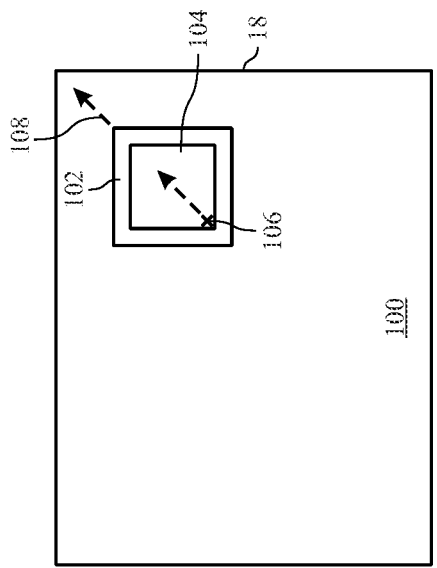
FIGS. 10A-10D illustrate foveation of a display and recovery from loss of eye tracking, according to an embodiment.

FIG. 10A illustrates the electronic display 18 having a high resolution area 104 positioned within a medium resolution area 102. The high resolution area 104 and the medium resolution area 102 are positioned within a low resolution area 100. The high resolution area 104 and the medium resolution area 102 are centered about a focal point 106 of the user's eyes on the electronic display 18.

Figure 10B:
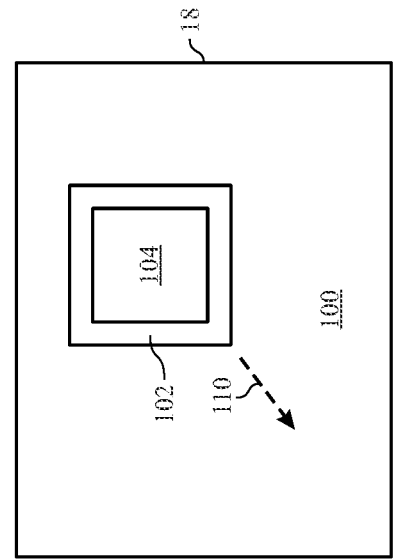

FIG. 10B illustrates the medium resolution area 102 and the high resolution area 104 moving on the electronic display 18 according to the focal point 106 of the eyes of the user. That is, as the focal point 106 of the eyes of the user move away from a center of the electronic display 18, the medium resolution area 102 and the high resolution area 104 each move in the same direction at the same velocity as indicated by the arrows 108. As long as the focal point 106 maintains the same direction and velocity, the medium and the high resolution areas 102, 104 also maintain the same direction and velocity. If the focal point changes direction or velocity, the medium and the high resolution areas 102, 104 change direction or velocity to be substantially the same.

Figure 10C:
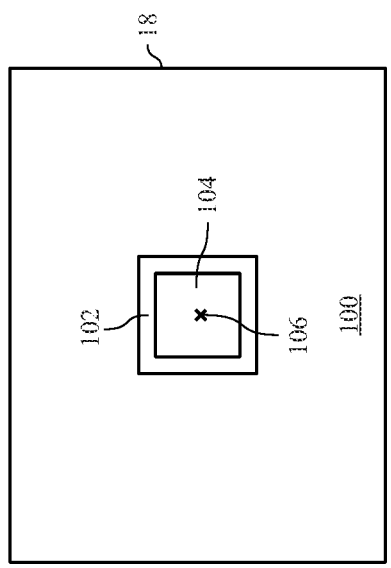

FIG. 10C illustrates a response of the foveated display 18 to a loss of eye tracking, according to one embodiment. The focal point 106 of the eyes of the user is not illustrated in FIG. 10C to indicate a loss of eye tracking. When loss of eye tracking occurs, a size of the medium resolution area 102 and a size of the high resolution area 104 are increased about a last known position of the focal point 106. That is, movement of the medium and the high resolution areas 102, 104 may stop at the last known position of the focal point 106. In some cases, the sizes of the medium resolution area 102 and the high resolution area 104 are increased proportionally. That is, a size of the high resolution area 104 may be a percentage of the size of the medium resolution area 102 as the sizes of the areas 102, 104 are changed.

In some embodiments, if the focal point 106 of the eyes of the user is moving at the time of loss of eye tracking, the foveated areas 102, 104 of the electronic display 18 may continue to move in the same direction and at the same velocity as the focal point 106, even after loss of eye tracking. That is, the foveated areas 102, 104 may continue to move away from the center of the electronic display while the size of the foveated areas changes. In this way, the techniques described herein improve the experience of the user by increasing a likelihood that the focal point of the eyes of the user is within the foveated areas even when eye tracking is not available. The foveated areas 102, 104 may continue to move on the electronic display 18 until a position threshold is satisfied or until the foveated areas 102, 104 reach an edge of the electronic display 18. The position threshold may be determined based on a speed and/or direction of movement of the eyes of the user just before loss of eye tracking. In some embodiments, the position threshold may be determined based on a center point of one or more of the foveated areas 102, 104 and may specify a distance from the center of the electronic display 18 or a distance from an edge of the electronic display 18.

The size of the medium and the high resolution areas 102, 104 may continue to increase until a size threshold is satisfied. The size threshold may provide a maximum size for the medium resolution area 102, the high resolution area 104, or both. A rate at which the size of the medium and the high resolution areas 102, 104 increases may be determined based on one or more criteria. The criteria may include a speed of the focal point 106 before loss of eye tracking, the type of content being displayed, a size of the electronic display 18, a size of the foveated areas before loss of eye tracking, obtained data based on human visual system behavior, and the like.

Figure 10D:
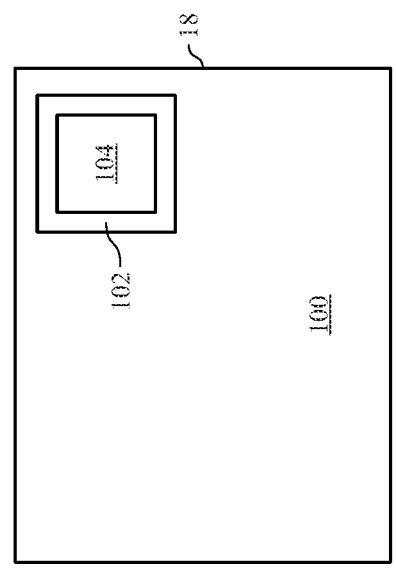

FIG. 10D illustrates recovery of the electronic display 18 from loss of eye tracking, according to one embodiment. As shown, after the time threshold and/or position threshold are satisfied, the high resolution area 104 and the medium resolution area 102 may begin to move toward the center of the electronic display 18. That is, as the time since loss of eye tracking increases, a likelihood of the focal point of the user's eyes being in a different location on the electronic display (e.g., closer to a center of the electronic display) rather than at the last known location increases. With this in mind, the present disclosure provides techniques to recover from loss of eye tracking while increasing a likelihood that the focal point of the user's eyes will be within or near the foveated areas of the display when eye tracking is restored.

The speed at which the medium resolution and the high resolution areas 102, 104 move toward the center of the electronic display, as indicated by an arrow 110, may be determined based on one or more criteria. The criteria may include a type of content displayed, a speed of the focal point 106 of the user's eye before loss of eye tracking, a location of the focal point 106 before loss of eye tracking, a size of the electronic display, a frame rate of the electronic display, a size of the foveated areas before and/or after loss of eye tracking, and the like.

The foveated areas 102, 104 may continue to move toward the center of the electronic display 18 until the foveated areas 102, 104 are centered about the center of the electronic display 18. Once the foveated areas 102, 104 are centered in the electronic display 18, the processor core complex 12, discussed with respect to FIG. 1, may maintain a size and position of the foveated areas 102, 104 until eye tracking is restored.

Figure 11:
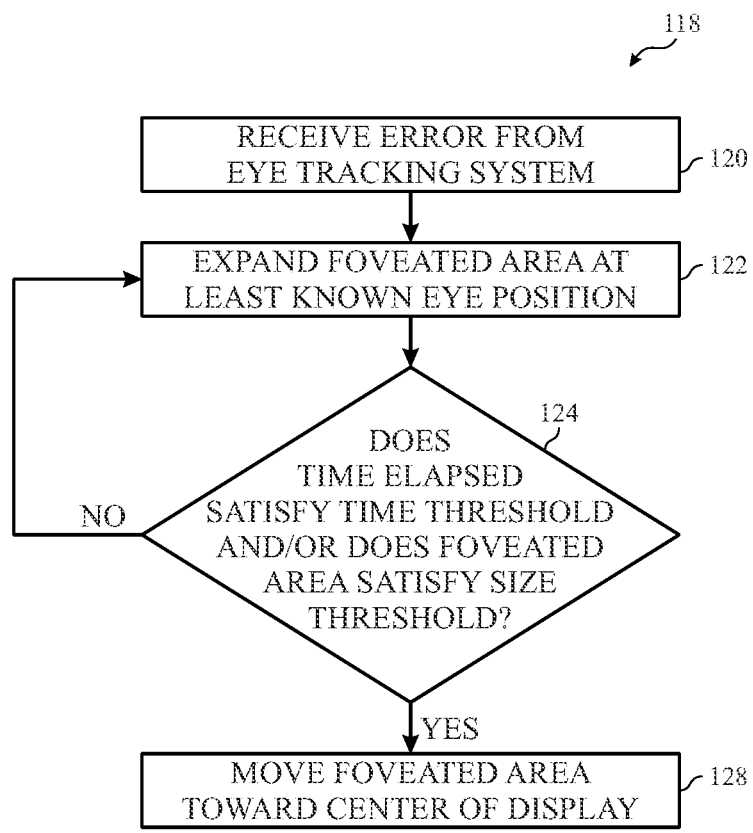
FIG. 11 is a flow chart depicting operations to recover from loss of eye tracking, according to an embodiment.

FIG. 11 is a flow chart 118 depicting operations to recover from loss of eye tracking, according to an embodiment. The operations depicted in the flow chart 118 may be performed or executed by one or more components of the electronic device 10 described with respect to FIG. 1, including the processor core complex 12. The flow chart 118 may include one or more operations corresponding to foveation and recovery of the electronic display discussed with respect to FIGS. 10A-10D.

At operation 120, an error is received from the eye tracking system, such as the eye tracker 32 in FIG. 1. The error may indicate that eye tracking of the eyes of a user is lost. The error may indicate to the processor core complex 12 that recovery from loss of eye tracking should begin.

At operation 122, the foveated area(s) of the electronic display are expanded about the last known position of the focal point of the user's eyes. If the focal point of the user's eyes was moving before loss of eye tracking, the foveated areas may continue to move in the same direction and at the same velocity as the focal point before loss of eye tracking.

At operation 124, the processor core complex 12 determines if a time elapsed since the error from the eye tracking system satisfies a time threshold. In addition or in the alternative, the processor core complex 12 may determine if a size of the foveated areas satisfies a size threshold. If the time threshold (or size threshold) is not satisfied, the foveated areas continue to expand at operation 122. If the time threshold (or size threshold) is satisfied, the foveated areas are moved toward a center of the electronic display, at operation 128, as discussed with respect to FIGS. 10A-10D.

FIGS. 12A-12G illustrate foveation of a display and recovery from loss of eye tracking, according to an embodiment. As discussed with respect to FIGS. 10A-10D, one or more components of the electronic device 10, described with respect to FIG. 1, may control at least some aspects of the foveation of the electronic display 18 described herein. That is, for example, the processor core complex 12 may control a size, shape, location, and/or movement of the foveated areas of the electronic display.

Figure 12A:
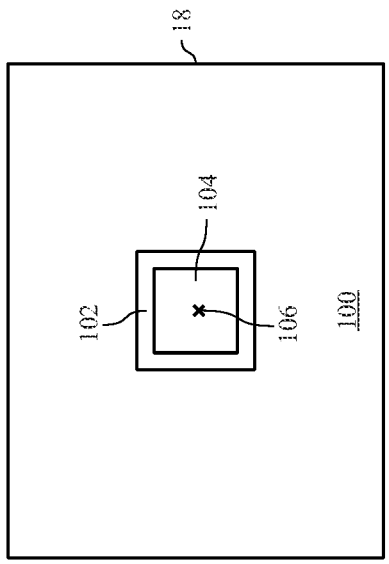
FIGS. 12A-12G illustrate foveation of a display and recovery from loss of eye tracking, according to an embodiment.

FIG. 12A illustrates the electronic display 18 having the high resolution area 104 disposed within the medium resolution area 102 which is disposed within the low resolution area 100. The high resolution area 104 and the medium resolution area 102 are centered about the focal point 106 of the user's eyes on the electronic display 18.

Figure 12B:
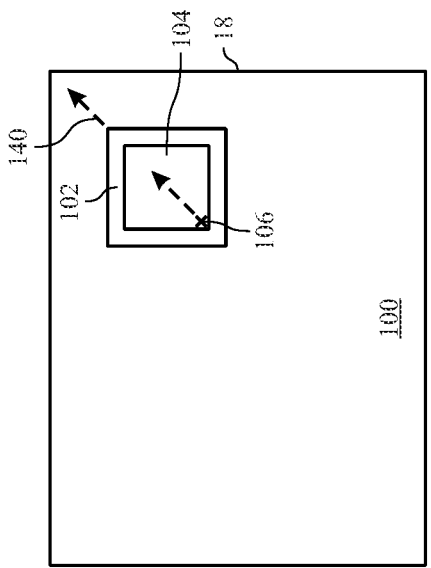

FIG. 12B illustrates the medium resolution area 102 and the high resolution area 104 moving on the electronic display 18. The medium resolution and the high resolution areas 102, 104 are moving in the direction of the arrows 140. A speed of movement of the medium resolution and the high resolution areas 102, 104 may be the same as a speed of the focal point 106.

Figure 12C:
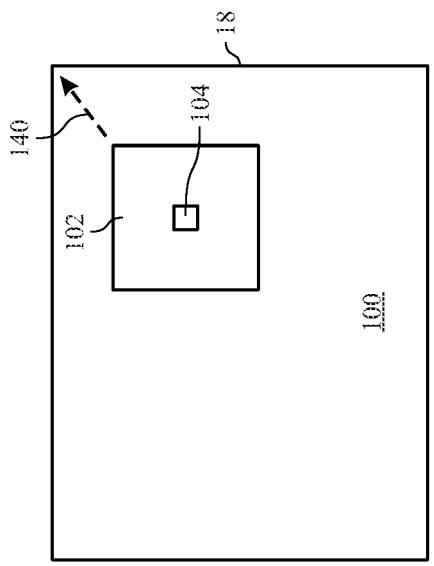
Figure 12D:
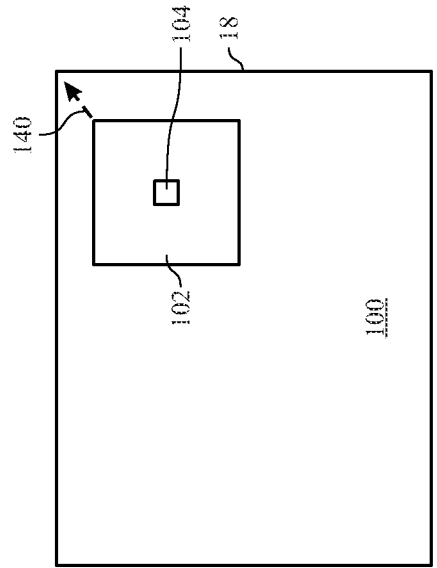

FIG. 12C illustrates a response of the electronic display 18 to a loss of eye tracking. As shown, the medium resolution and the high resolution areas 102, 104 continue to move at the speed and in the direction of the focal point before the loss of eye tracking. A size of the medium resolution area 102 begins to increase and a size of the high resolution area 104 begins to decrease when the loss of eye tracking occurs. In this manner, the coverage (e.g., size) of the foveated area providing at least medium resolution increases, while an increase in processing power may be mitigated by reducing a size or resolution of the high resolution area 104. The coverage area of at least medium resolution provides at least a medium viewing quality to the user. As shown in FIG. 12D, the foveated areas 102, 104 may continue to move within the low resolution area 100 even after the size of the foveated areas 102, 104 stops changing.

In some embodiments, which can be combined with one or more embodiments above, the foveated areas 102, 104 may continue to move within the electronic display 18 until a position threshold is satisfied or until the foveated areas 102, 104 reach the edge of the electronic display 18. The size threshold may be satisfied before the position threshold, and therefore, the foveated areas 102, 104 may continue to move on the electronic display when a size of the foveated areas is not changing. In some cases, the position threshold may be satisfied before the size threshold, and therefore, the foveated areas may change in size while the foveated areas are not moving on the electronic display 18. A time threshold may also be used to determine a likelihood of whether a focal point of the user is located within one of the foveated areas 102, 104.

Figure 12E:
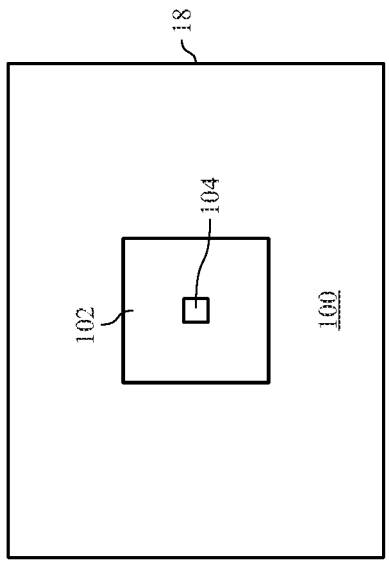
Figure 12F:
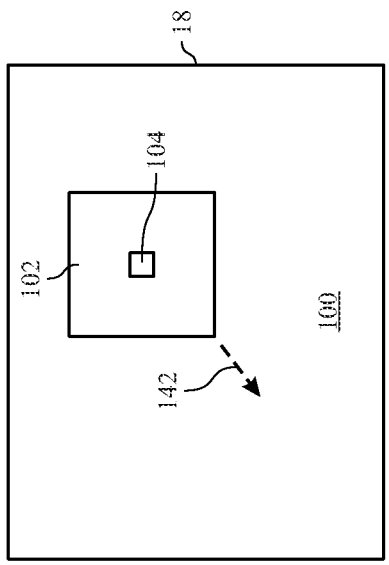

Once the time threshold and/or position threshold are satisfied, the foveated areas 102, 104 begin to move toward the center of the electronic display 18, as illustrated by the arrow 142 in FIG. 12E. A size of the foveated areas 102, 104 may remain substantially the same as those discussed with respect to FIG. 12D. A speed at which the foveated areas 102, 104 move toward the center may be determined based on one or more criteria, such as those discussed with respect to FIG. 10D. The foveated areas 102, 104 may continue to move toward the center of the electronic display 18 until the foveated areas 102, 104 are disposed about the center of the electronic display 18 as shown in FIG. 12F.

Figure 12G:
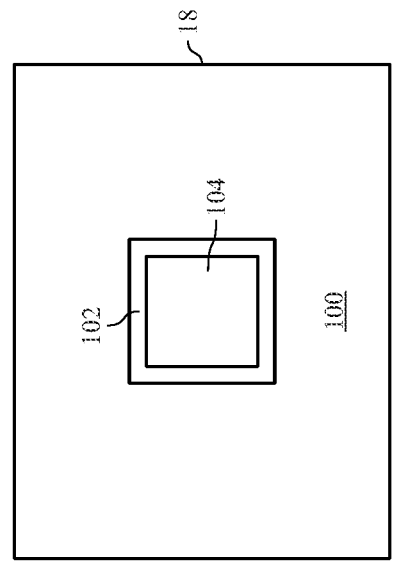

FIG. 12G illustrates static foveation of the foveated areas 102, 104, according to one embodiment. That is, upon arriving the center of the electronic display 18 (e.g., being disposed about the center of the electronic display 18), a size of one or more of the foveated areas 102, 104 may change. As shown, a size of the medium resolution area 102 remains constant while a size of the high resolution area 104 increases. A size and rate at which the size of the high resolution area 104 changes may be based on the criteria and factors discussed above. In some embodiments, as discussed below with respect to FIGS. 15A-15D, a size of the high resolution area 104 may increase after loss of eye tracking while a resolution of the high resolution area 104 decreases.

Figure 13:
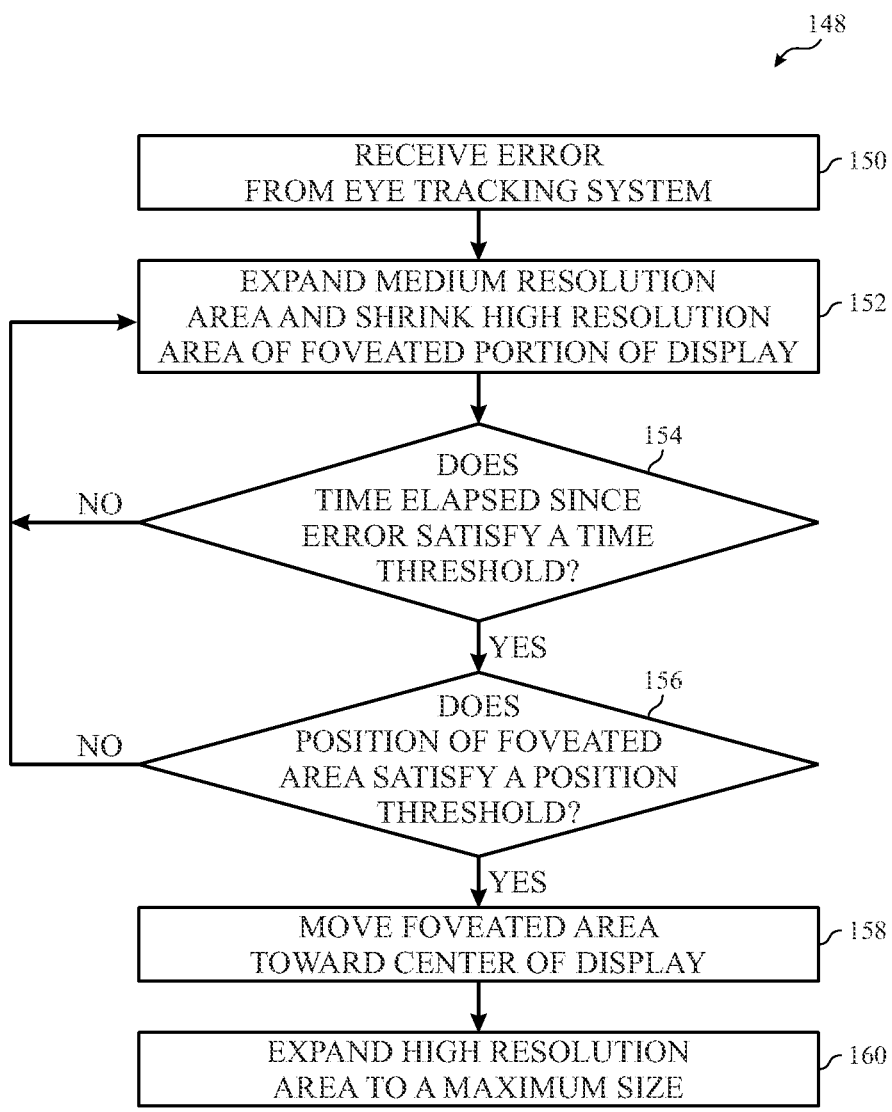
FIG. 13 is a flow chart depicting operations to recover from loss of eye tracking, according to an embodiment.

FIG. 13 is a flow chart 148 depicting operations to recover from loss of eye tracking on a foveated display, according to an embodiment. The flow chart 148 begins at operation 150 where an error is received from the eye tracking system. The error may indicate an error of the eye tracker such that eye tracking of the eyes of the user is not available for some period of time. The error may also indicate that recovery from loss of eye tracking should begin.

At operation 152, a size of the medium resolution area is increased while the size of the high resolution area is decreased. This change in size of the medium and the high resolution areas may occur while the medium and the high resolution areas are moving on the electronic display. That is, the medium and the high resolution areas may continue to move according to a trajectory of the focal point of the eyes of the user before loss of eye tracking.

At operation 154, the processor core complex of the electronic device, such as the processor core complex 12 discussed with respect to FIG. 1, determines if a time elapsed since the loss of eye tracking satisfies a time threshold. If not, the sizes of the medium resolution area and the high resolution area are changed according to operation 152.

If the time threshold is satisfied, the processor core complex determines if the position of one or more of the medium resolution and/or high resolution areas satisfy a position threshold at operation 156. If the position threshold is not satisfied, the size of the medium resolution and the high resolution areas is changed at operation 152.

If the position threshold is satisfied, the medium resolution and the high resolution areas begin to move toward the center of the electronic display at operation 158. The speed at which the medium resolution and the high resolution areas move toward the center of the electronic display may be determined based on the factors and criteria discussed above. Moving these areas toward the center of the display may increase the likelihood that the focal point of the eyes of the user will be located within these areas when eye tracking is restored, as it may be more likely that focus of the eyes of the user will be closer to the center of the display rather than the edges of the display.

As may be appreciated, though the current embodiments refer to movement of the foveated areas toward the center of the display, movement of the foveated area toward other portions of the display could be performed in other embodiments. For example, based upon contextual (e.g., saliency) information of the images displayed on the display, it may be more likely that the focus of the eyes of the user will be at another part of the display (e.g., a more salient area of the display). A salient area of the display may be considered an area of interest based on the image content. The focal point of the eyes of the user may be drawn to the salient area of the display based on the content.

When a likely focus area is known, it may be prudent, during recovery, to default movement of the foveated areas toward that portion of the display rather than the center of the display. Thus, in an example where the images displayed have dynamic movement only in the upper right corner (i.e., other portions of the images in the display are still—this may be referred to as "saliency by the effect of movement"), the likely focal area may be the area where dynamic movement is being rendered. Accordingly, in this example, during recovery, the movement of the foveated areas may be toward the upper right corner (i.e., toward the dynamic movement being rendered).

Upon the medium and the high resolution areas reaching the center of the electronic display, at operation 160, the size of the high resolution area is increased until reaching a maximum size. The medium and the high resolution areas may reach the center of the electronic display when the medium and the high resolution areas are disposed about a center point of the electronic display. Increasing a size of the high resolution area at operation 160 increases a likelihood of the focal point of the eyes of the user being located within the high resolution area when loss of eye tracking occurs for a relatively long period of time (i.e., about 1 second or longer).

Figure 14B:
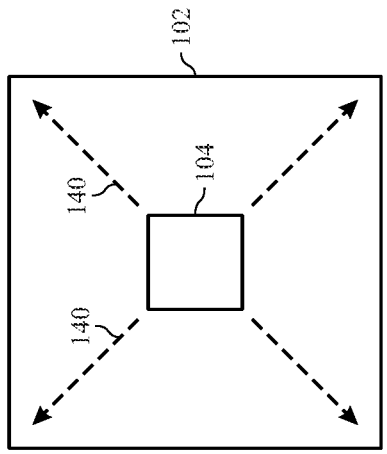
FIGS. 14A-14C illustrate foveation of a portion of a display, according to an embodiment.
Figure 14C:
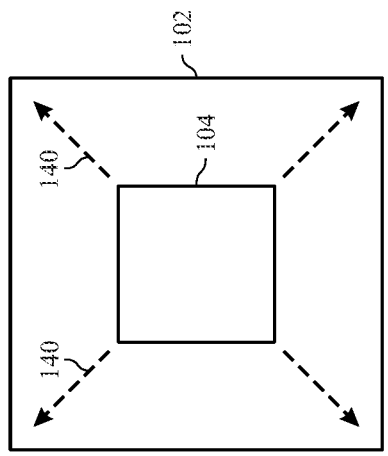
Figure 14A:
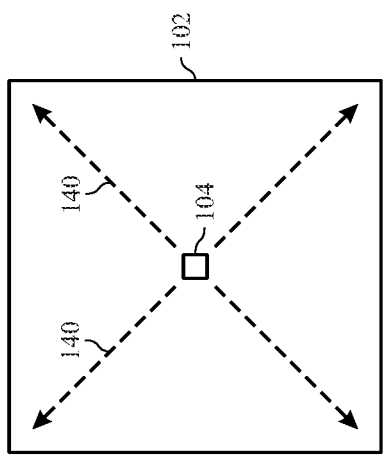

FIGS. 14A-14C illustrate foveation of a portion of a display, according to an embodiment. FIG. 14A illustrates the high resolution area 104 disposed within the medium resolution area 102. Arrows 140 extend from an outer edge of the high resolution area 104 to an outer edge of the medium resolution area 102. The arrows 140 represent a gradual decrease in resolution from the high resolution area 104 to the outer edge of the medium resolution area 102. That is, a resolution of the medium resolution area 102 may taper from a higher resolution near the high resolution area 104 to a lower resolution near the outer edge of the medium resolution area 102.

In some embodiments, as described above, the resolution of the medium resolution area 102 may be constant. In other embodiments, as here, the resolution of the medium resolution area 102 may gradually decrease as indicated by the arrows 140. In still other embodiments, a constant resolution of the medium resolution area 102 may be changed to a gradually decreasing resolution in response to a loss of eye tracking. The change in resolution may occur before, during, or after the foveated areas are moved toward a center of the electronic display.

The gradually decreasing resolution of the medium resolution area 102 may reduce an amount of resources used to foveate and render the image content on the electronic display. Further, the gradually decreasing resolution of the medium resolution area 102 may counteract increased resource usage due to expansion of the high resolution area 104. The gradually decreasing resolution may also reduce an occurrence of artifacts on the display that are visible to the user and thus improve or at least maintain an experience of the user.

FIGS. 14B and 14C illustrate expansion or enlargement of the high resolution area 104. The arrows 140 illustrate that the resolution of the medium resolution area 102 gradually decreases from the edge of the high resolution area 104 to the outer edge of the medium resolution area 102. The expansion of the high resolution area 104 may correspond to the expansion of the high resolution area discussed with respect to at least FIGS. 10C, 11, 12G, and 13.

While FIGS. 14A-14C illustrate a gradually decreasing resolution of the medium resolution area 102 with an expanding high resolution area 104, it should be understood that a similar decreasing resolution may be used with a shrinking high resolution area 104. Further, with respect to FIGS. 14A-14C, it should be noted that the medium resolution area 102 may correspond to the electronic display 18. That is, the high resolution area 104 may expand in size while the resolution of the remaining portions of the electronic display 18 gradually decrease from the edge of the high resolution area 104 to the edge of the electronic display 18.

FIGS. 15A-15D are sequential graphs illustrating changes to foveated areas of a display during recovery from loss of eye tracking, according to an embodiment. The changes to the foveated areas may include a change in size and/or a change in resolution. A horizontal axis depicts the resolution of various foveated areas of the electronic display 18. A vertical axis depicts a distance of the foveated areas from a center of focal point of the eyes of the user (i.e., a gaze of the user).

A first line 182 may be representative of the foveated areas discussed with respect to FIGS. 10A-10D and 11. A second line 184 may be representative of the foveated areas discussed with respect to FIGS. 12A-12G and 13. A third line 186 may be representative of the foveated areas discussed with respect to FIGS. 14A-14C. The medium resolution areas and the high resolution areas corresponding to the lines 182, 184, and 186 are centered about the focal point of the eyes of the user on the display.

Figure 15A:
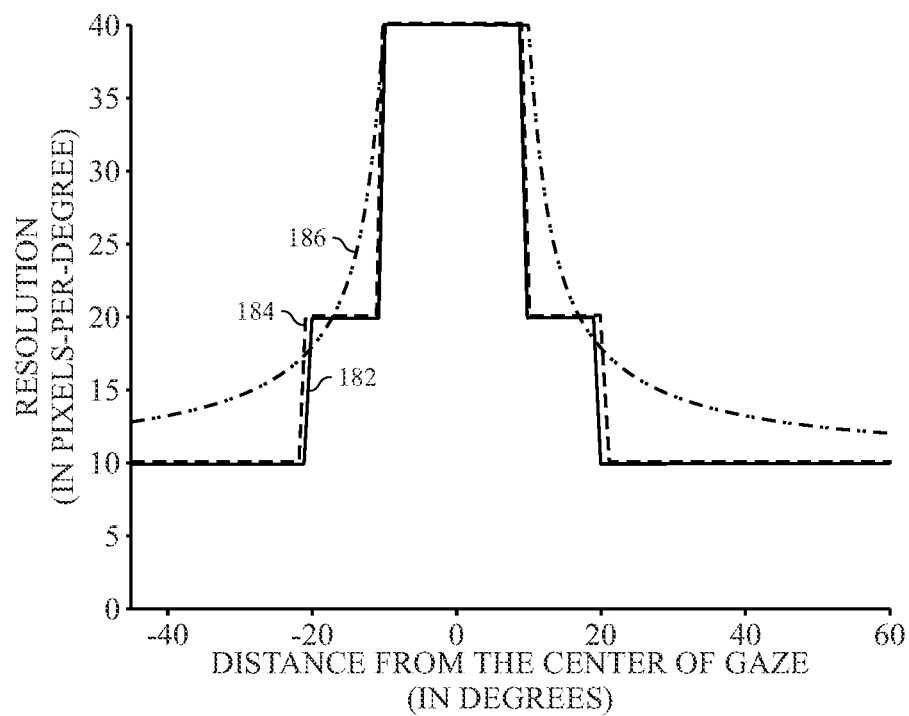
FIGS. 15A-15D illustrate changes to foveated areas of a display during recovery from loss of eye tracking, according to an embodiment.

FIG. 15A illustrates foveated areas on an electronic display when a loss of eye tracking occurs. As shown, a width of high resolution areas (e.g., the horizontal lines at a resolution of about 40 pixels-per-degree) corresponding to the first line 182, the second line 184, and the third line 186 is between about 15 degrees and about 25 degrees, such as about 20 degrees. A width of medium resolution areas (e.g., the horizontal lines at a resolution of about 20 pixels-per-degree) corresponding to the first line 182 and the second line 184 is between about 35 degrees and about 45 degrees, such as about 40 degrees.

A resolution of an outer foveated area surrounding the high resolution area may be tapered from an edge of the high resolution area to a peripheral edge of the outer foveated area. The tapered resolution of the outer foveated area is illustrated by the third line 186 and is discussed with respect to FIGS. 14A-14C above.

Figure 15B:
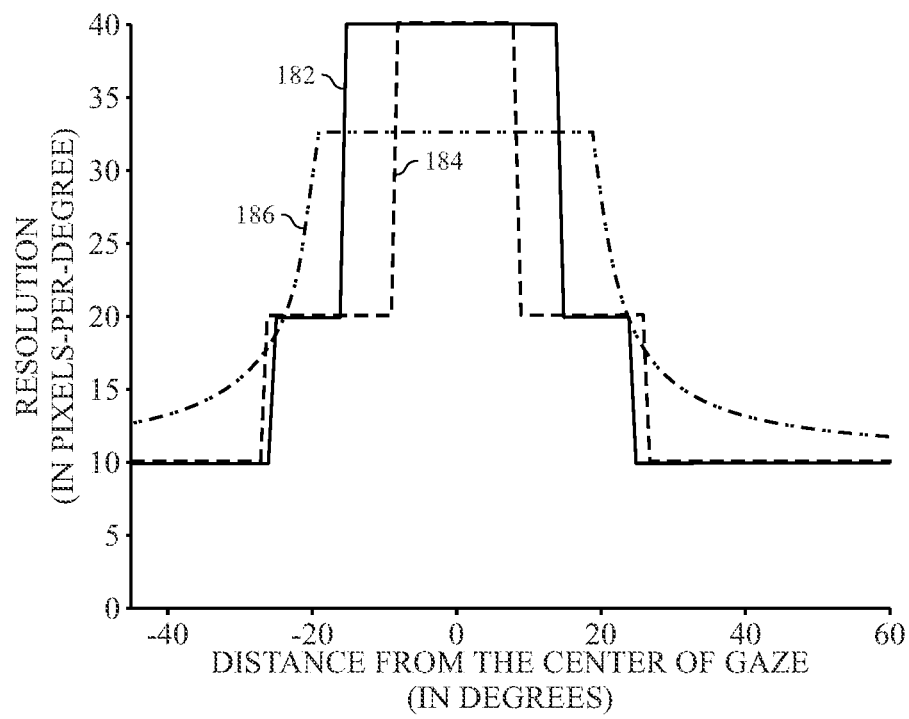

FIG. 15B illustrates a change to the size of the foveated areas in response to the loss of eye tracking. For example, a width of the high resolution area corresponding to the first line 182 has expanded from that in FIG. 15A and is between about 28 degrees and about 42 degrees, such as about 36 degrees. A width of the high resolution area corresponding to the second line 184 has decreased from that in FIG. 15A and is between about 8 degrees and about 22 degrees, such as about 16 degrees. A width of the medium resolution areas corresponding to the first line 182 and the second line 184 is between about 20 degrees and about 30 degrees, such as about 25 degrees.

A width of the high resolution area corresponding to the third line 186 has increased from that of FIG. 15A and is between about 35 degrees and about 45 degrees, such as about 40 degrees. Furthermore, a resolution of the high resolution area corresponding to the third line 186 has decreased to between about 30 pixels-per-degree and about 35 pixels-per-degree, such as about 32 pixels-per-degree.

Figure 15C:
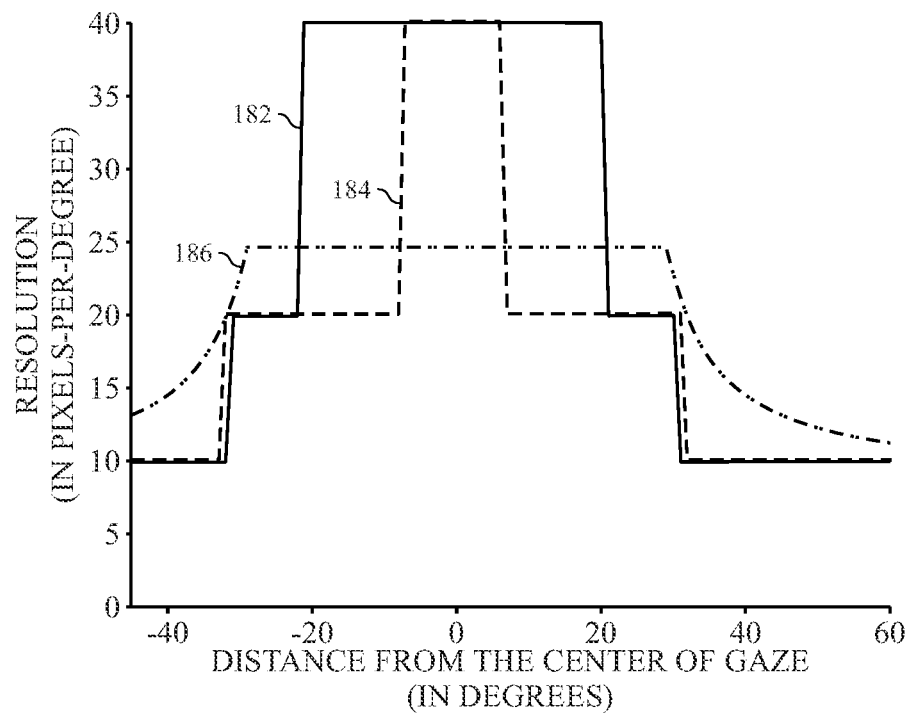
Figure 15D:
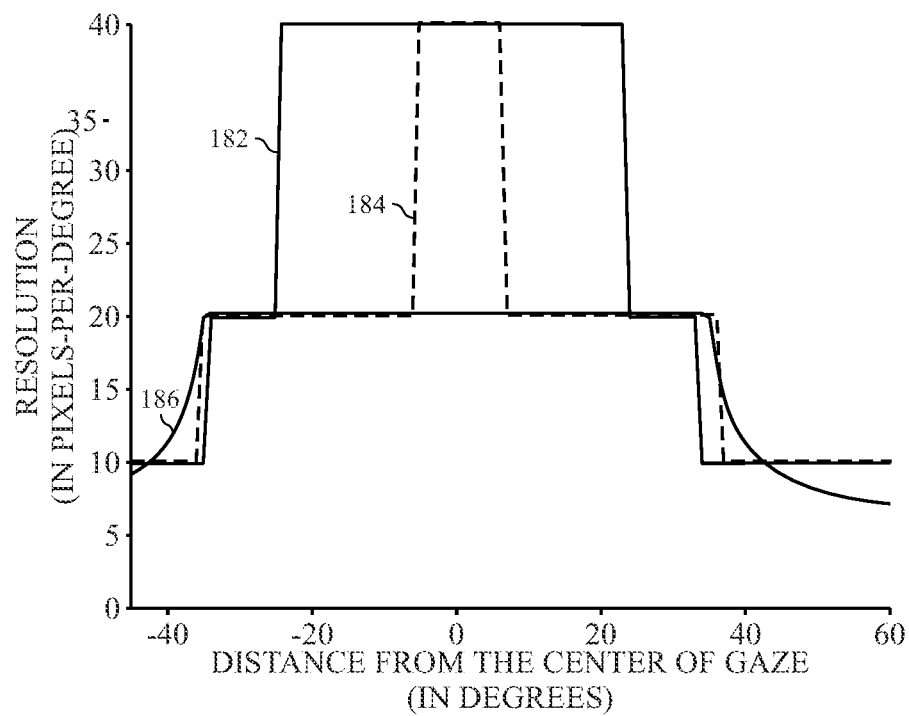

In FIGS. 15C and 15D, the sizes of the high resolution areas and the medium resolution areas corresponding to the first line 182, the second line 184, and the third line 186 continue to change. Further, the resolution of the high resolution area corresponding to the third line 186 continues to decrease. The advantages of changing the size and resolution of the foveated areas is discussed above. Namely, the changes enable a reduction in resources used to render the foveated image and increase a likelihood of the focal point of the eyes of the user being within the foveated areas.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device, comprising:
    a display;
    an eye tracker configured to collect eye tracking data regarding a gaze of one or more eyes of a user on the display; and
    processing circuitry operatively coupled to the display and configured to:
        receive an indication of an error from the eye tracker;
        in response to the indication of the error:
            expand one or more foveated areas of the display about a last known position of the gaze of the user;
            determine if a time elapsed since receiving the error satisfies a time threshold; and
            upon the time elapsed satisfying the time threshold:
                move the one or more foveated areas toward a center of the display;
                reduce at least one of the one or more foveated areas of the display;
                or both.

2. The electronic device of claim 1, wherein the display comprises a plurality of pixels, the one or more foveated areas includes a high resolution area and a medium resolution area, and each of the high resolution area and the medium resolution area is rendered by a subset of the plurality of pixels.

3. The electronic device of claim 2, wherein the processing circuitry is configured to identify saliency information based on image content rendered on the display during each update of the image content.

4. The electronic device of claim 2, wherein the processing circuitry is configured to receive a direction and a speed of the gaze of the user from the eye tracker before the indication of the error is received.

5. The electronic device of claim 4, wherein the processing circuitry is configured to identify saliency information based on image content rendered on the display during each update of the image content.

6. The electronic device of claim 1, wherein a speed at which the one or more foveated areas move toward the center of the display is based on at least one of a speed of the gaze of the user before receiving the indication of the error, a location of the gaze of the user on the display before the indication of the error is received, a type of content being displayed, a size of the display, a size of the one or more foveated areas before the indication of the error is received.

7. The electronic device of claim 1, wherein a rate at which the one or more foveated areas expands is based on at least one of the time elapsed since receiving the error, a speed of the gaze of the user before receiving the indication of the error, a location of the gaze of the user on the display before the indication of the error is received, a type of content being displayed, a size of the display, a size of the one or more foveated areas before the indication of the error is received.

8. A non-transitory computer-readable medium storing instructions that, when executed by a processor, cause the processor to:
    receive an indication of an error from an eye tracking system coupled to a display;
    in response to the indication of the error:
        expand a first foveated area of the display and shrink a second foveated area of the display;
        determine if a time elapsed since receiving the indication of the error satisfies a time threshold;
        determine if a position of the first foveated area or the second foveated area satisfies a position threshold; and
        upon the time elapsed satisfying the time threshold and the position satisfying the position threshold:
            move the first foveated area and the second foveated area toward a center of the display; and
            expand the second foveated area of the display.

9. The non-transitory computer-readable medium of claim 8, wherein a resolution of the second foveated area is greater than a resolution of the first foveated area.

10. The non-transitory computer-readable medium of claim 8, wherein the second foveated area is positioned within the first foveated area, and wherein a resolution of the first foveated area tapers from a high resolution near the second foveated area to a low resolution at a periphery of the first foveated area.

11. The non-transitory computer-readable medium of claim 10, wherein the instructions cause the processor to receive a direction and a speed of a focal point of one or more eyes of a user from the eye tracking system before the indication of the error is received.

12. The non-transitory computer-readable medium of claim 11, wherein the first foveated area and the second foveated area move in the direction and at the speed of the focal point of the one or more eyes of the user before the indication of the error is received.

13. The non-transitory computer-readable medium of claim 12, wherein a speed the first foveated area and the second foveated area move toward the center of the display is based on at least one of the speed of the focal point of the one or more eyes of the user before receiving the indication of the error, a location of the focal point of the one or more eyes of the user on the display before the indication of the error is received, a type of content being displayed, a size of the display, a size of the first foveated area and the second foveated area before the indication of the error is received.

14. The non-transitory computer-readable medium of claim 8, wherein the position threshold is determined based on a center point of the second foveated area, and the position threshold measures a distance from the center of the display to the center point or a distance from the center point to an edge of the display.

15. A method comprising:
    receiving an input about a gaze of a user on a display, wherein the input includes at least a location on the display, a direction the gaze is moving on the display, and a speed the gaze is moving;
    receiving an indication of an error from an eye tracker;
    in response to receiving the indication of the error:
        moving one or more foveated areas of the display in the direction and at the speed of the gaze from a last known point of the gaze before the indication of the error is received;
        expanding a size of a first foveated area of the one or more foveated areas while decreasing a resolution of the first foveated area;

determining that a time elapsed since receiving the indication of the error satisfies a time threshold;

determining that a position of the first foveated area satisfies a position threshold; and based upon the time satisfying the time threshold and the position satisfying the position threshold:
stop expanding the first foveated area; and
move the one or more foveated areas toward a center of the display.

16. The method of claim 15, wherein a resolution of a second foveated area of the one or more foveated areas tapers from a higher resolution near the first foveated area to a lower resolution at a peripheral edge of the second foveated area.

17. The method of claim 16, wherein the first foveated area is positioned within the second foveated area.

18. The method of claim 16, wherein a rate at which the first foveated area expands is based on at least one of a speed of the gaze of the user before receiving the indication of the error, a location of the gaze of the user on the display before the indication of the error is received, a type of content being displayed, a size of the display, a size of the one or more foveated areas before the indication of the error is received.

19. The method of claim 16, wherein the position threshold is determined based on a center point of the second foveated area and a size of the first foveated area.

20. The method of claim 15, wherein a speed the one or more foveated areas move toward the center of the display is based on at least one of a speed of the gaze of the user before receiving the indication of the error, a location of the gaze of the user on the display before the indication of the error is received, a type of content being displayed, a size of the display, a size of the one or more foveated areas before the indication of the error is received.

* * * * *

UNITED STATES PATENT AND TRADEMARK OFFICE
CERTIFICATE OF CORRECTION

| | | |
|---|---|---|
| PATENT NO. | : 11,244,660 B2 | |
| APPLICATION NO. | : 17/174138 | |
| DATED | : February 8, 2022 | |
| INVENTOR(S) | : Yashas Rai Kurlethimar et al. | |

It is certified that error appears in the above-identified patent and that said Letters Patent is hereby corrected as shown below:

In the Claims

Column 17 Line 47 Claim 5 should read:
--5. The electronic device of claim 4, wherein the processing circuitry is configured to move the one or more foveated areas in the same direction and at a predefined speed based on the gaze of the user immediately before the indication of the error is received.--

Signed and Sealed this
Twenty-first Day of February, 2023

Katherine Kelly Vidal
*Director of the United States Patent and Trademark Office*